(12) United States Patent
Wojtal et al.

(10) Patent No.: US 10,675,599 B2
(45) Date of Patent: Jun. 9, 2020

(54) MIXING PADDLE FOR A GRAVIMETRIC BLENDER

(71) Applicant: Sterling Products, Inc., New Berlin, WI (US)

(72) Inventors: Casey M. Wojtal, Milwaukee, WI (US); Nathan A. Cook, Menomonee Falls, WI (US)

(73) Assignee: STERLING PRODUCTS, INC., New Berlin, WI (US)

( * ) Notice: Subject to any disclaimer, the term of this patent is extended or adjusted under 35 U.S.C. 154(b) by 177 days.

(21) Appl. No.: 15/664,486

(22) Filed: Jul. 31, 2017

(65) Prior Publication Data

US 2019/0030501 A1    Jan. 31, 2019

(51) Int. Cl.
| | | |
|---|---|---|
| *B01F 7/04* | (2006.01) | |
| *B01F 3/18* | (2006.01) | |
| *B01F 7/00* | (2006.01) | |
| *B01F 15/02* | (2006.01) | |
| *B29B 7/16* | (2006.01) | |
| *B29B 7/28* | (2006.01) | |
| *B29B 7/24* | (2006.01) | |
| *B29K 105/00* | (2006.01) | |
| *B29B 7/60* | (2006.01) | |

(52) U.S. Cl.
CPC ............... *B01F 7/04* (2013.01); *B01F 3/184* (2013.01); *B01F 7/00116* (2013.01); *B01F 7/00291* (2013.01); *B01F 7/00308* (2013.01); *B01F 7/00583* (2013.01); *B01F 15/0235* (2013.01); *B29B 7/16* (2013.01); *B29B 7/244* (2013.01); *B29B 7/283* (2013.01); *B01F 2215/0049* (2013.01); *B29B 7/60* (2013.01); *B29K 2105/251* (2013.01)

(58) Field of Classification Search
CPC .......................................................... B01F 7/04
USPC .................. 366/325.8, 325.9, 325.92, 325.93
See application file for complete search history.

(56) References Cited

U.S. PATENT DOCUMENTS

| | | | | |
|---|---|---|---|---|
| 289,786 | A | * 12/1883 | Taylor ..................... | A01J 13/00 366/325.8 |
| 388,740 | A | * 8/1888 | Stockdale ................ | A23G 9/12 366/149 |
| 569,925 | A | * 10/1896 | Kramer ................... | F16H 19/06 74/89.22 |

(Continued)

FOREIGN PATENT DOCUMENTS

| | | |
|---|---|---|
| CN | 2596983 Y | 1/2004 |
| CN | 204865577 U | 12/2015 |

(Continued)

*Primary Examiner* — David L Sorkin
(74) *Attorney, Agent, or Firm* — Lempia Summerfield Katz LLC

(57) ABSTRACT

A mixing paddle configured for use with a gravimetric blender. The mixing paddle has a first rotor; a second rotor spaced axial from the first rotor; and at least one mixing blade disposed between the first rotor and the second rotor. The at least one mixing blade of the mixing paddle includes an inner edge having a first sloped portion and a second sloped portion directed inward toward a middle portion of the at least one mixing blade. The mixing blade is configured to be narrower in the middle portion between the outer edge and the inner edge than at a first end and second end.

19 Claims, 9 Drawing Sheets

(56) References Cited

U.S. PATENT DOCUMENTS

| | | | | |
|---|---|---|---|---|
| 959,367 | A | * | 5/1910 | Massie .............. B01F 15/00207 366/142 |
| 2,118,616 | A | * | 5/1938 | McConnaughay .......................... B01F 7/00008 366/325.93 |
| 5,389,310 | A | | 2/1995 | Leiponen |
| 6,322,244 | B1 | | 11/2001 | Marchesini et al. |
| 6,880,966 | B1 | | 4/2005 | Cappellino et al. |
| 2011/0075508 | A1 | | 3/2011 | Hall |

FOREIGN PATENT DOCUMENTS

| | | |
|---|---|---|
| CN | 205216705 U | 5/2016 |
| CN | 205760823 U | 12/2016 |
| CN | 205833010 U | 12/2016 |
| DE | 3711987 A1 | 10/1988 |
| DE | 20004488 U1 | 9/2001 |
| FR | 2644709 B1 | 5/1991 |
| JP | 2004321967 A | 11/2004 |

\* cited by examiner

MIXING PADDLE FOR A GRAVIMETRIC BLENDER

BACKGROUND

1. Field of the Disclosure

The disclosure generally relates to gravimetric blenders, and more particularly to a mixing paddle for blending material within a gravimetric blender and the method of blending material.

2. Description of Related Art

Gravimetric blenders are used primarily in the plastic industry. Gravimetric blenders are configured to individually weigh two or more ingredient materials and mix them for later processing in an injection molding machine, a plastic extrusion process machine, a blow molding machine, or the like. The ingredient materials are typically dispensed from hoppers that are then weighed using a load cell to ensure proper proportions. The weighed ingredient materials are transferred to a mixing chamber to be combined and blended. Gravimetric blenders, or batch blenders, are also used in connection with other industries where multiple ingredient materials need to be combined and mixed.

Existing gravimetric blenders utilize agitators to mix the ingredient materials. The existing agitators disturb the ingredient materials located near the agitators. Current agitators do not sufficiently mix the ingredient materials within the entire mixing chamber, which leads to dead spots where the ingredient materials are not sufficiently mixed. Further, existing agitators can sometimes fracture or break under high stress loads.

SUMMARY

In one example, according to the teachings of the present invention, a mixing paddle may comprise a first rotor; a second rotor spaced axial from the first rotor; and at least one mixing blade disposed between the first rotor and the second rotor. The mixing paddle may further include the at least one mixing blade having an inner edge with a first sloped portion and a second sloped portion directed inward toward a middle portion of the at least one mixing blade. The mixing blade of the mixing paddle may be narrower in the middle portion between the outer edge and the inner edge than at a first end and second end.

In one example, the mixing paddle may further comprise a drive shaft extending at least between the first rotor and second rotor along an axis of the mixing paddle.

In one example, the first rotor and the second rotor of the mixing paddle may each include a hub and a rim with spokes extending radially between.

In one example, the at least one mixing blade of the mixing paddle may include a first boss protruding from the first end and a second boss protruding from the second end, wherein the first boss mates with a first notch on the first rotor and the second boss mates with a second notch on the second rotor.

In one example, the at least one mixing blade if the mixing paddle maybe connected to the rim and one of the spokes of each of the first rotor and the second rotor.

In one example, the first rotor and the second rotor of the mixing paddle may each include a hub and a rim with and at least one spoke extending radially between and wherein the at least one mixing blade is orientated at tilt angle in a range of 15 to 50 degrees as defined by a plane of the at least one spoke.

In one example, the at least one mixing blade outer edge of the mixing paddle is beveled.

In one example, the at least one mixing blade of the mixing paddle includes four mixing blades and the at least one spoke includes four spokes.

In one example, the first sloped portion and the second sloped portion of the mixing paddle form a v-shaped section in the at least one mixing blade that is configured to direct material from each of the first rotor and second rotor inward towards a middle portion of the at least one mixing blade.

In one example, according to the teachings of the present invention, a gravimetric blender may comprise a housing; a mixing chamber at a lower portion of the housing; and at least one mixing blade disposed between the first rotor and the second rotor. The at least one mixing blade within the gravimetric blender may include an inner edge having a first sloped portion and a second sloped portion directed inward toward a middle portion of the at least one mixing blade, the mixing blade being narrower in the middle portion between the outer edge and the inner edge than at a first end and second end.

In one example, the at least a portion of the mixing chamber of the gravimetric blender may be concentric with an axis of the mixing paddle.

In one example, a longitudinal axis the at least one mixing blade is parallel to a longitudinal axis of the mixing chamber.

In one example, wherein the mixing paddle extends across the width of the mixing chamber.

In one example, according to the teachings of the present invention, a method of mixing granulated material using a gravimetric blender, the method comprising the steps of gravity feeding granulated material from a hopper of the gravimetric blender into a mixing chamber; and rotating a mixing paddle within the mixing chamber to mix the granulated material. The at least one mixing blade of the mixing paddle is disposed axially between a first rotor and a second rotor that rotate about a drive shaft, the at least one mixing blade lifting a portion of the granulated material as the mixing paddle rotates such that the granulated material is directed towards the center of the mixing chamber by a first sloped portion and a second sloped portion of the at least one mixing blade.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosed gravimetric blender and mixing paddle solve or improve upon one or more of the above noted and/or other problems and disadvantages with prior known gravimetric blenders and agitators. The disclosed gravimetric blender and mixing paddle blends material within the entire mixing chamber, thereby reducing or eliminating dead spots within the mixing chamber. The disclosed mixing paddle configuration improves durability and is capable of withstanding high stress loads. These and other objects, features, and advantages of the present disclosure will become apparent to those having ordinary skill in the art upon reading this disclosure.

Figure 1:
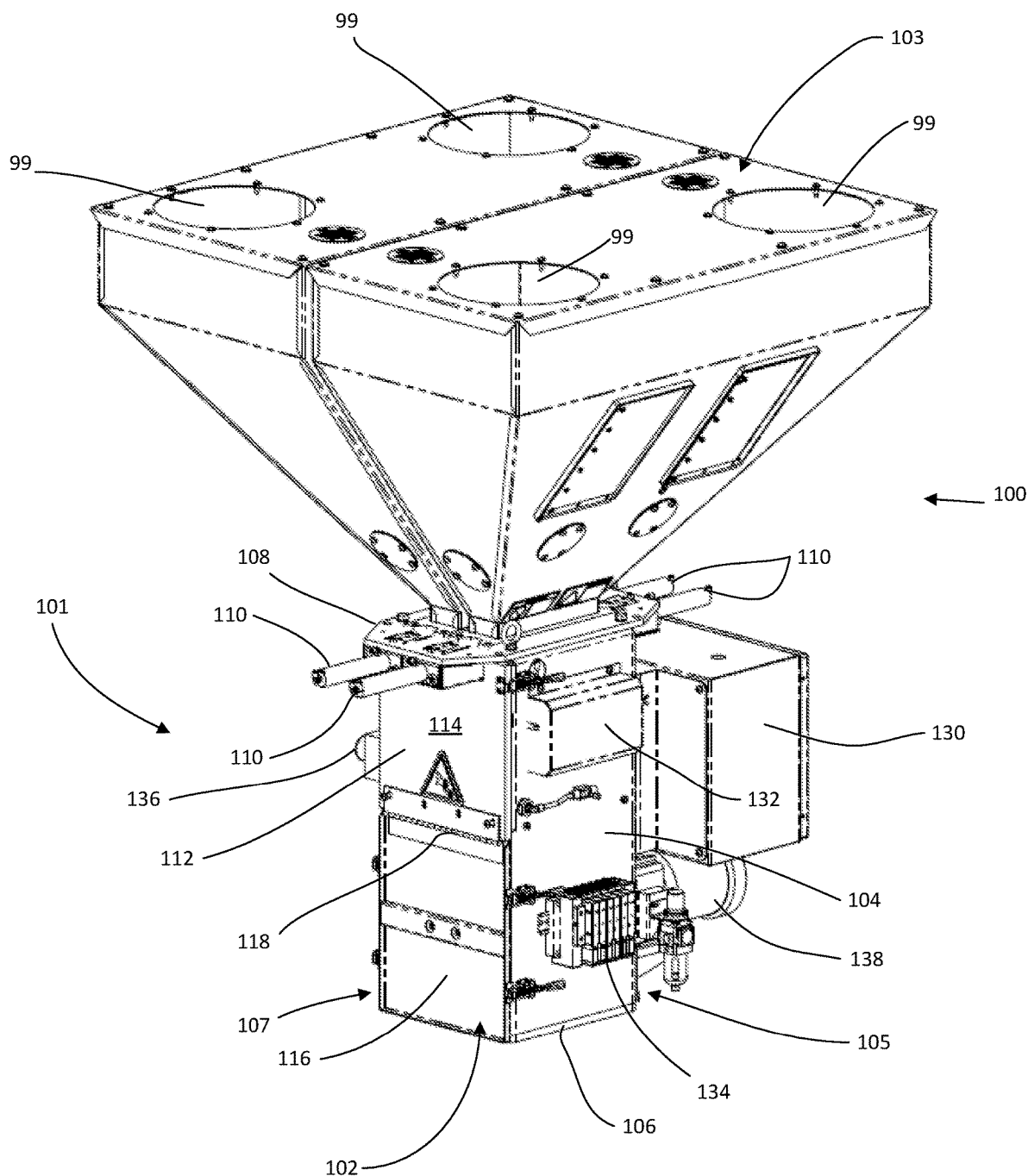
FIG. 1 depicts a perspective view of one example of a gravimetric blender according to the teachings of the present disclosure.

Turning now to the drawings, FIG. 1 depicts one example of a gravimetric blender 100.

The gravimetric blender 100 includes a mixing device 101 and a hopper assembly 103 having a number of supply hoppers 99. The mixing device 101 has a housing 102 with a bottom plate 106 and top plate 108. The hopper assembly 103 is positioned above the mixing device 101. As depicted in FIG. 1, the hopper assembly 103 may include two or more supply hopper sections. The hopper assembly 103 may be shaped as an upside-down pyramid and may include four sides. The hopper assembly 103 further may include removable lids on the top to cover the supply hoppers 99. Ingredient materials are loaded into the supply hoppers 99. An opening (not shown) is located at the bottom of each of the supply hoppers 103. The openings provide a path for the ingredient materials to exit the supply hoppers via a gravity feed and to enter the mixing device 101.

The supply hoppers 99 store different ingredient materials. These different ingredient materials are later combined according to certain ratios. The combined ingredient materials are then transferred to a subsequent processing machine, such as those described above. The gravimetric blender 100 may be used with granulated plastic, metals, resins, wood, or the like. Generally, the ingredient materials are provided as a pellet or granulated medium. The material could also be in the form of powders, pulps, fibers, or the like. The ingredient materials may further be any material utilized in plastics processing.

Figure 2:
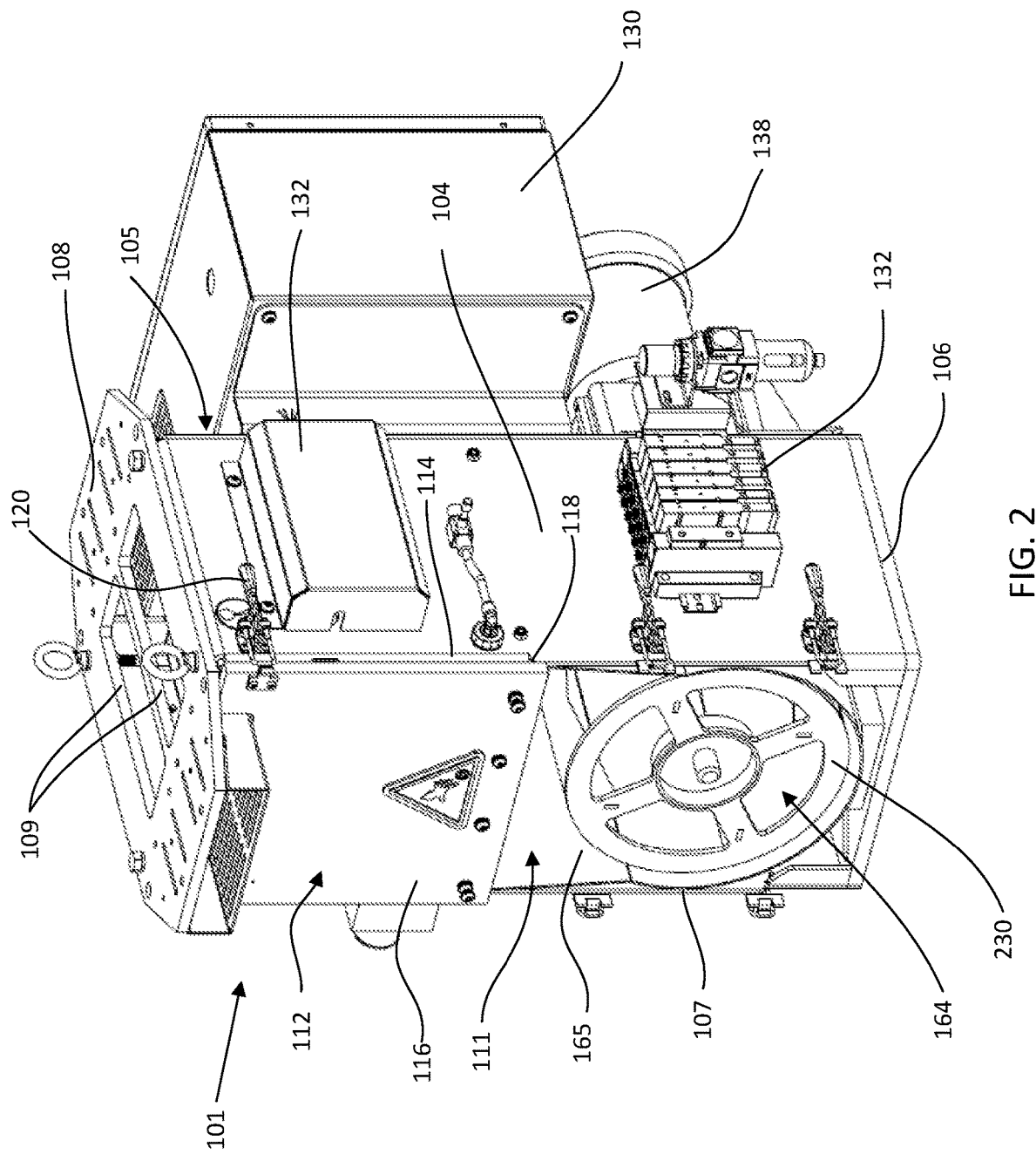
FIG. 2 depicts a perspective view of part of the gravimetric blender of FIG. 1, including a chamber.

The hopper assembly 103 may be supported by or rest on the top plate 108 of the mixing device 101. The top plate 108 is shaped to cover the top of the housing 102. As depicted in FIG. 2, the top plate 108 includes openings 109. The openings 109 are sized to accept a bottom portion (not shown) of the supply hoppers 99. The openings 109 provide a flow path for the ingredient materials from the hopper assembly 103 to enter an internal portion 111 of the mixing device 101.

Slide gates 110 may be used to selectively open or close off the opening of each of the supply hoppers 99. The slide gates 110 are used to control the dispensing of ingredient materials in the supply hoppers 99. The slide gates 110 are configured to control the amount of ingredient materials dispensed from each supply hopper 99 into the openings 109. The slide gates 110 control the amount of ingredient materials based on the length of time the slide gate 110 is open. The number of supply hoppers 99 and configuration of the hopper assembly 103 may vary depending on the requirements of a subsequent processing application and/or final product.

As depicted in FIGS. 1 and 2, the housing 102 supports the top plate 108. The housing 102 is a rectangular structure with four sides: a first side 104, a back side 105, second side 107, and front cover 112. The housing 102 further includes a top 108; and bottom 106. Each of the first side 104, back side 105, and second side 107 extend from the bottom plate 106 to the top plate 108. The first side 104, back side 105, and second side 107 are formed as rigid members to structurally support top plate 108 and supply hoppers 103.

Figure 3:
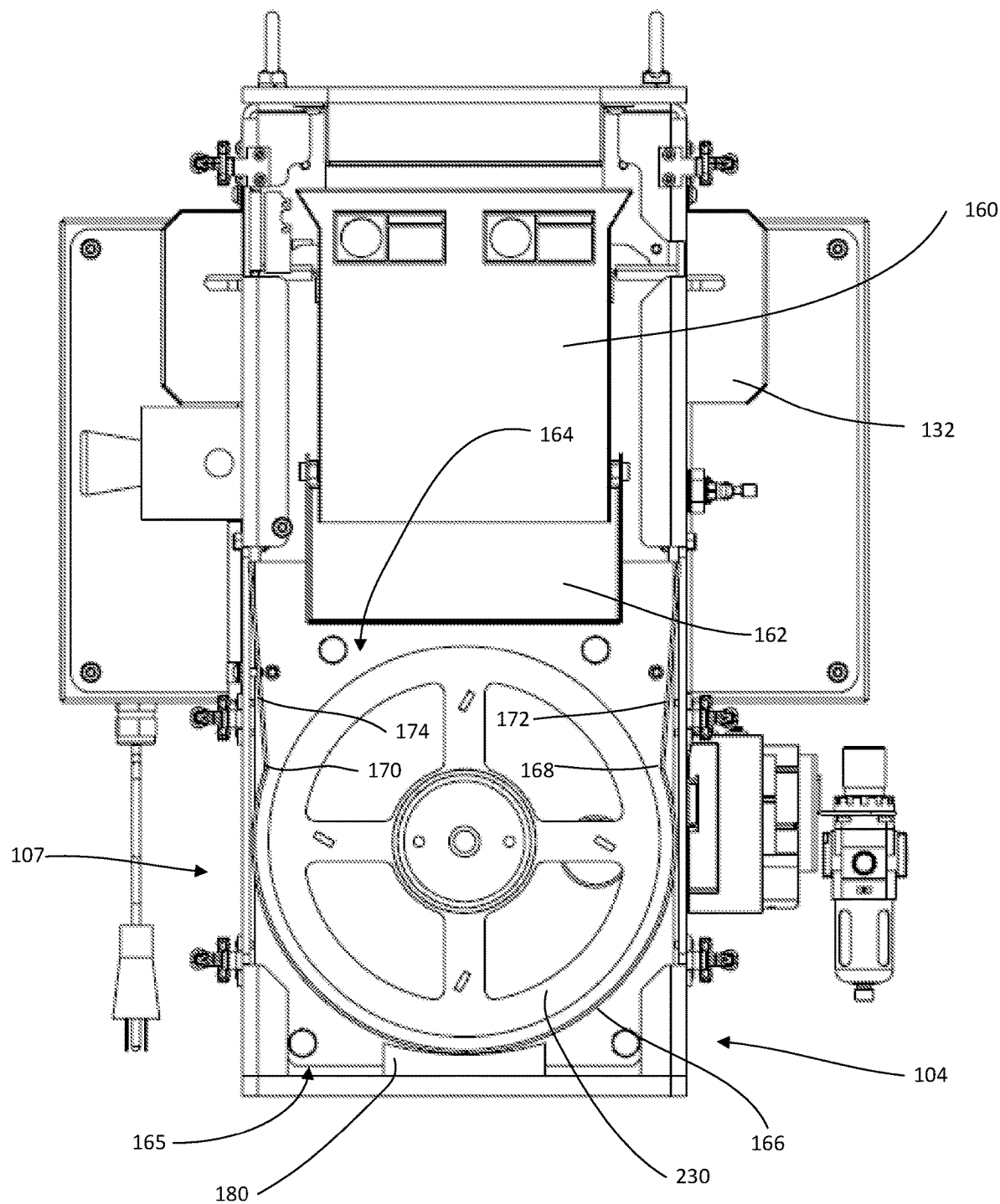
FIG. 3 depicts a front view of part of the gravimetric blender of FIG. 2.

A load cell 132 is mounted on each side of the housing 101. Each load cell 132 is connected to a weigh hopper 160 located on the interior portion 111 of the gravimetric blender 100 as shown in FIGS. 2 and 3. The load cells 132 are configured to measure the weight of the material within the weigh hopper 160, which is described more fully below.

A valve stack 134 is mounted to the housing 102 near the bottom of the first side 104. The valve stack 134 includes a number of pneumatic valves that control the operation of the slide gates 110, weigh hopper 160, and other functions of the gravimetric blender 100. Valves within the valve stack 134 operate to open the slide gates 110 to allow ingredient material to flow out of the hopper assembly 103 or operate to close the slide gates to stop the flow of material.

As depicted in FIGS. 1 and 2, a controller 130 may be mounted to the back side 105 of the housing 102. The controller 130 functions to control the operation of the gravimetric blender 100. The controller 130 may include a user interface (not shown) for selecting controls and displaying information related to the gravimetric blender 100. The controller 130 controls and maintains information about the gravimetric blender 100. The controller 130 also controls and maintains information about automated blending operations, including maintaining information in the form of recipes. The controller 130 may be used for example to start or stop the gravimetric blender 100, open or close the weigh hopper 160, open or close the slide gates 110, program or control ingredient material ratios, and any number of other functions associated with the gravimetric blender 100.

A mixing motor 138 is also mounted to the lower end of the back side 105 of the housing 102. An output shaft 140 of the mixing motor 138 is configured to align with an opening 185 that extends through the back side 105. The mixing motor 138 may be a DC motor, AC motor, or a pneumatic driven motor. The mixing motor 138 is configured to turn a mixing paddle as described below. The mixing motor 138 may also be connected to the first side 104 or second side 107, with the output shaft 140 connecting to a gear reducer.

A system-stop switch 136 is provided on the second side 107 of the housing 102 and is configured to stop the operation of the gravimetric blender 100. The system-stop 136 may be mounted anywhere on the housing 102 that is accessible to an operator.

As depicted in FIGS. 1-3, the front cover 112 covers a front opening of the housing 102 of the gravimetric blender 100. The front cover 112 includes a top portion 114 and a door 116. The top portion 114 covers approximately the upper half of the front of the gravimetric blender 100. The top portion 114 is secured to the housing 102 by upper latches 120.

The door 116 covers approximately the lower half of the front of the gravimetric blender 100. A hinge 118 connects the top portion 114 and door 116 together. The hinge 118 permits the door 116 to rotate down. When the door 116 is rotated down to the open position, access may be gained into the mixing chamber 164 or interior portion 111 of the gravimetric blender 100. The door 116 is secured to the housing 102 in a closed position by latches or other fastening means.

The bottom plate 106 is shaped to close off and cover the bottom of the housing 102. The bottom plate 106 may be configured to support the gravimetric blender 100 upon a surface such as a bench or mezzanine mount stand.

As depicted in FIG. 3, the internal portion 111 includes the weigh hopper 160. The weigh hopper 160 is generally funnel shaped. The top portion is larger than the bottom portion. The weigh hopper 160 is open at the top and bottom. The bottom of the weigh hopper 160 is selectively closed off by a gate 162 (shown in the open position). The weigh hopper 160 is configured to receive the ingredient material from the supply hoppers 99.

The gate 162 is hingedly connected to the weigh hopper 160. In a closed stated, the gate 162 seals the opening on the bottom of the weigh hopper 160. With the gate 162 closed, the weigh hopper 160 holds the ingredient material dispensed from the selected supply hopper 99 and can weigh the ingredient material. The weigh hopper 160 is connected to the load cells 132 located on the first side 104 and second side 107. As ingredient material is dispensed into the weigh hopper 160, the load cells 132 measure the weight of the material present in the weigh hopper 160 using a strain gauge. When the desired amount of ingredient material is dispensed into the weigh hopper 160, the gate 162 is opened. In an open-state (as shown) the gate 162 pivots down and away from the weigh hopper 160, exposing the opening at the bottom of the weigh hopper 160. Ingredient material may then gravity feed into a mixing chamber 164 below the weigh hopper 160. A pneumatic cylinder may be used to actuate the gate 162 from a closed to opened position and an opened to closed position.

The mixing chamber 164 comprises a mixing drawer 165 and the back side 105 and front cover 112 located at each end of the mixing drawer 165. The mixing drawer 165 is substantially the same width as the depth of the internal portion 111 of the housing 102 from the back side 105 to the front panel.

The drawer 165 includes a radiused 166 portion 166 which is formed as a partial cylinder portion. The radiused portion 166 terminates into a first bend 168 and a second bend 170. The first bend 168 is located on the first side 104. A first attachment portion 172 extends up vertically from the first bend 168. Screws are placed through the first attachment portion 172 to fasten the mixing chamber 164 to the first side 104. The second bend 170 is located on the second side 107. A second attachment portion 174 extends up vertically from the second bend 170. Screws are placed through the second attachment portion 174 to fasten the mixing chamber 164 to the second side 107. The mixing chamber 164 may be formed from a single piece of material, i.e. a blank. The blank is bent to form a radiused portion 166 and bent to form the bends 168, 170 and attachment portions 172, 174.

As depicted in FIG. 3, the mixing chamber 164 is supported by a drawer support 180. The drawer support 180 rests upon the bottom plate 106 and supports the bottom of the mixing chamber 164. The drawer support 180 includes a concave contact surface to conform to the radius of the mixing chamber 164.

As depicted in FIG. 3, the mixing chamber 164 creates a chamber for the ingredient material to be mixed and combined within. The ingredient material is blended and uniformly combined within the mixing chamber 164 by the mixing paddle 230.

Figure 4:
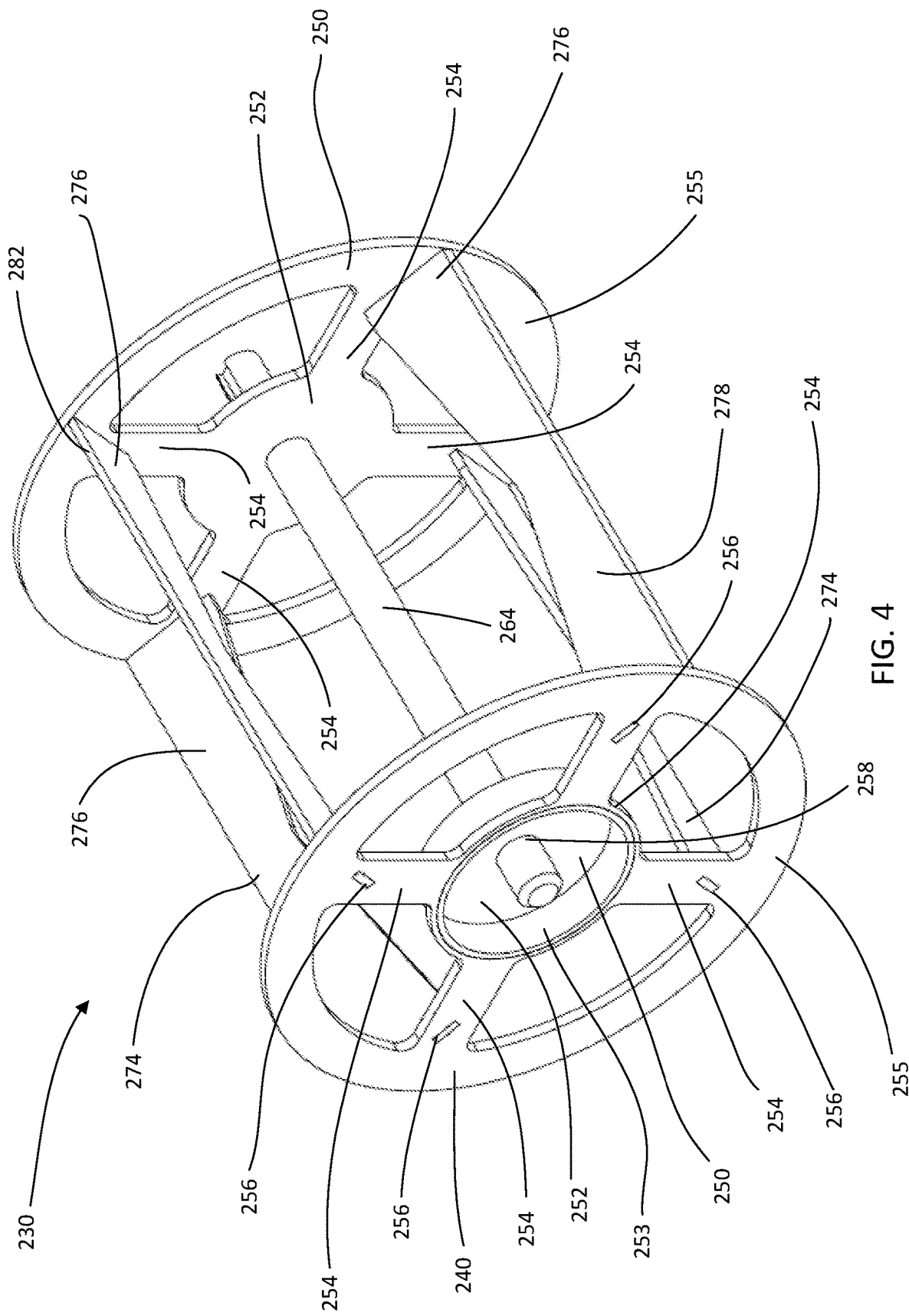
FIG. 4 depicts a front perspective of a mixing paddle of the mixing chamber of FIG. 2 and according to the teachings of the present disclosure.
Figure 5:
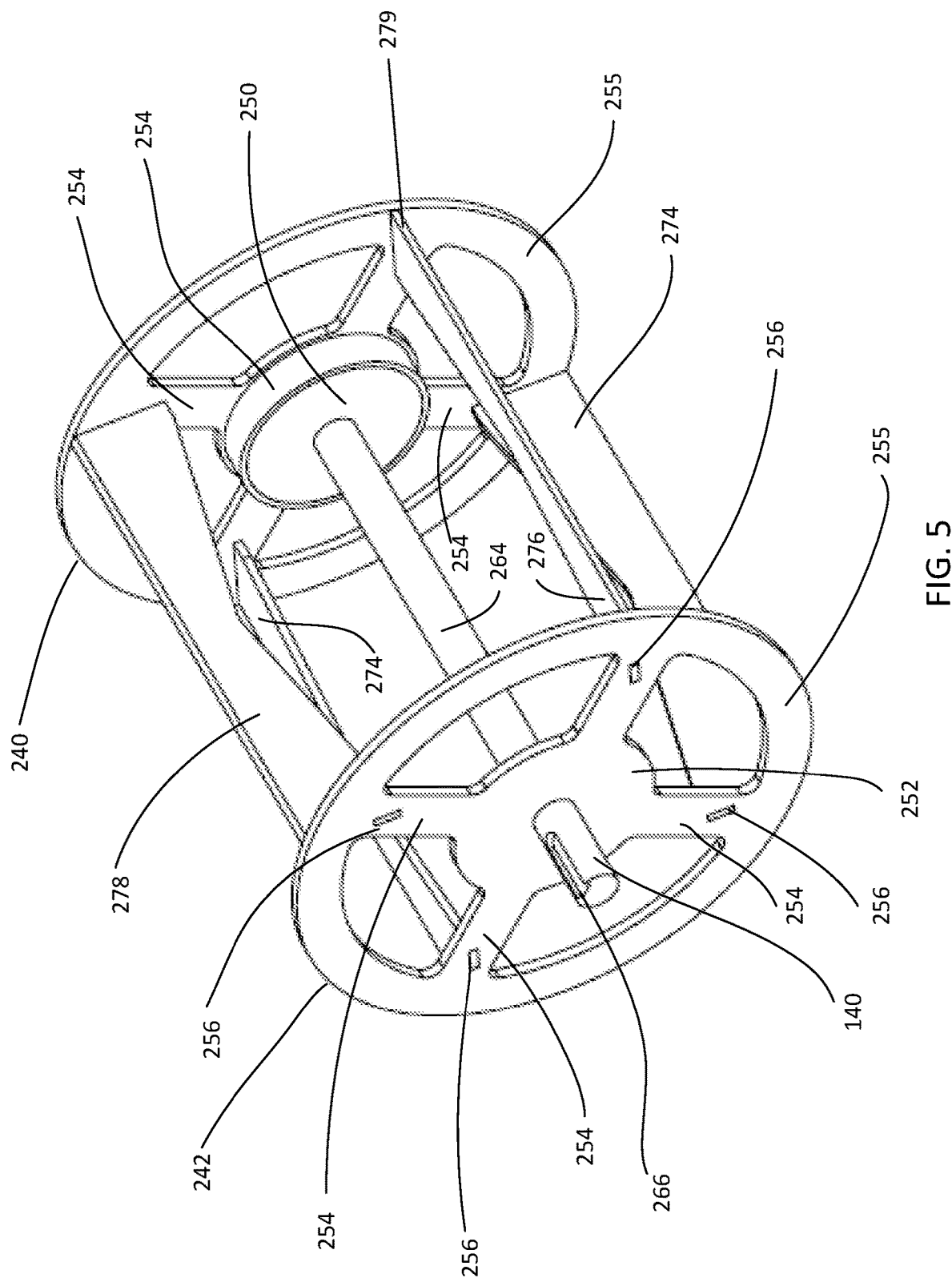
FIG. 5 depicts a rear perspective view of the mixing paddle of FIG. 4.

Depicted in FIGS. 4 and 5, the mixing paddle 230 includes a first rotor 240 and a second rotor 242. The first rotor 240 includes an inset hub 250. The inset hub 250 is located in the center of the first rotor 240. The inset hub 250 includes a disc 251. The disc 251 is a circular planar element. The disc 251 may include an opening 258 in the center. The opening 258 may accept a drive shaft 264 of the mixing paddle 230. Extending around the circumference of the disc 251 is a ridge 253. The ridge 253 extends up from the surface of the disc 251 at a right-angle. The disc 251 and ridge 253 form the inset structure of the inset hub 250.

The inset hub 250 further includes spokes 254. Spokes 254 are located around the circumference of the ridge 253, at the upper edge opposite the disc 251. The longitudinal portion of the spokes 254 are radially aligned with the center of the inset hub 250. The spokes 254 radiate outward from the ridge 253. Each of the spokes 254 connects to a rim 255. The rim 255 forms the outer edge of the first rotor 240. The rim 255 extends around the full circumference of the first rotor 240. The rim 255 is concentric with the inset hub 250. The first rotor 240 may also be of the same configuration as the second rotor 242 as described below.

The second rotor 242 includes a hub 252. The hub 252 is a circular planar element. The hub 252 may include an opening 258 in the center. The opening 258 may accept the drive shaft 264 of the mixing paddle 230. The hub 252 further includes a plurality of spokes 254. Spokes 254 are located around the circumference of the hub 252, at the edge of the hub 252. The spokes 254 are radially aligned with the center of the hub 252 and radiate outward from the hub 252. Each of the spokes 254 connects to a rim 255. The rim 255 forms the outer edge of the second rotor 242. The rim 255 extends around the full circumference of the second rotor 242. The rim 255 is concentric with the hub 252.

As depicted in FIGS. 4 and 5, the first rotor 240 is axial spaced from the second rotor 242. The drive shaft 264 extends between the rotors 240, 242 along the axis of the mixing paddle 230. Mixing blades 274 also extend between the first rotor 240 and second rotor 242. The mixing blades 274 are each formed as an elongated blade. The mixing blades 274 each include opposed surfaces 276 and 278. The surfaces 276 and 278 are parallel surfaces. The mixing blades 274 each include an outer edge 282 on the radial outer edge of the blade. The outer edge 282 may be beveled between the opposed surfaces 276 and 278. The bevel may be in the range of 30 to 60 degrees. Instead, the outer edge 282 may be flat and square to the surfaces 276, 278 or rounded.

Figure 6:
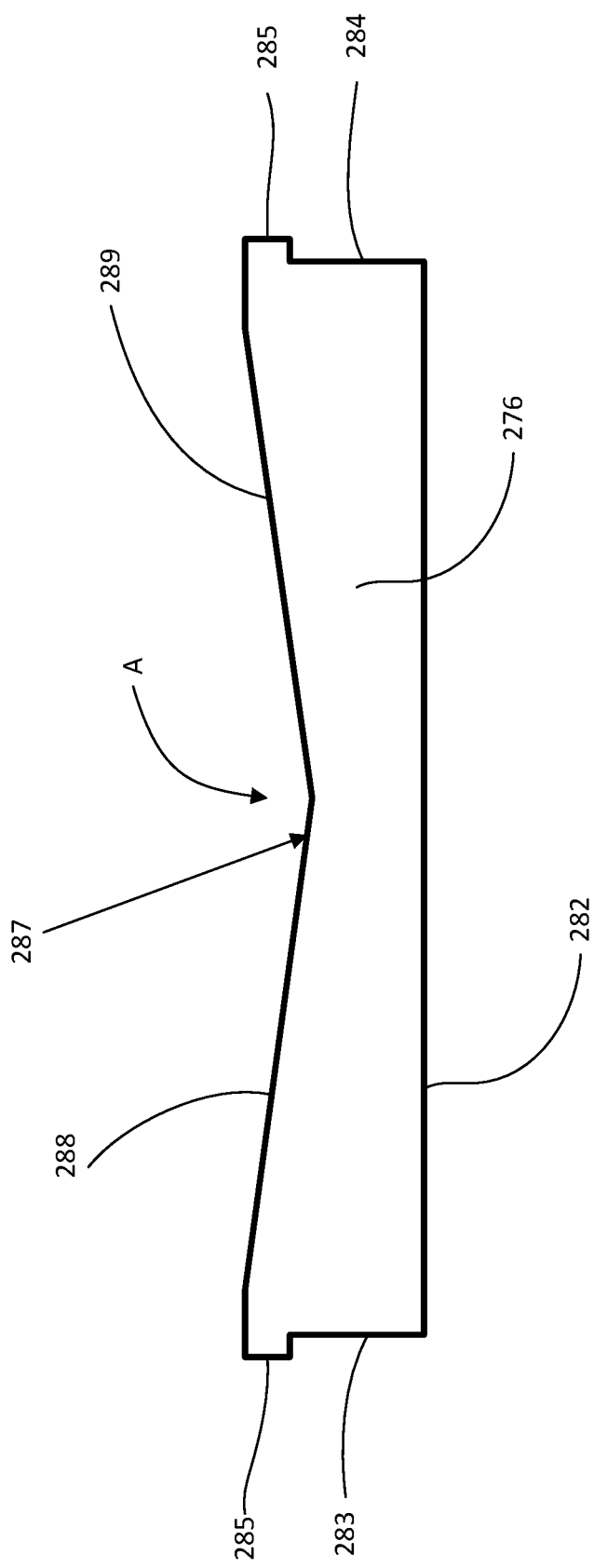
FIG. 6 depicts a top view of a mixing blade of the mixing paddle of FIGS. 4 and 5.

As depicted in FIG. 6, the blades each have a first end 283 and a second end 284. The ends 283, 284 form a right angle with the outer edge 282. A tab or boss 285 protrudes out from each of the ends 283, 284, parallel to the elongated edge 282.

The blades 274 also each have an inner edge 287 opposite the outer edge 282. The inner edge 287 includes a first sloped portion 288 and a second sloped portion 289. The first sloped portion 288 extends from the boss 285 on the first end 283 toward a middle portion of the mixing blade. The second sloped portion 289 extends from the boss 285 on the second end 284 toward a middle portion of the mixing blade. The intersection of the first sloped portion 288 and second sloped portion 289 form an angle A in a v-shaped configuration. The angle A between the first sloped portion 288 and the second sloped portion 289 may be in the range of 130 to 180 degrees. The sloped portions 288, 289 are angled such that mixing blades 274 are narrower in the middle than adjacent the ends 283, 284. It is contemplated that the sloped edge 287 may include additional sloped configurations that are capable of functioning as described below.

The mixing blades 274 of the mixing paddle 230 extend between the first rotor 240 to the second rotor 242. As depicted in FIGS. 4 and 5, the mixing blades 274 are attached to the first rotor 240 and second rotor 242 around the periphery of the rims 255. The mixing blades 274 are each attached to the first rotor 240 and second rotor 242 at a respective one of the spokes 254 and the rims 255. The outer edge 282 forms the radial outer extremity of the mixing blade of the mixing paddle 230. As depicted in FIGS. 4 and 5, there are four spokes 254 between each the first rotor 240 and the second rotor 242 and four mixing blades 274 attached thereto.

Figure 7:
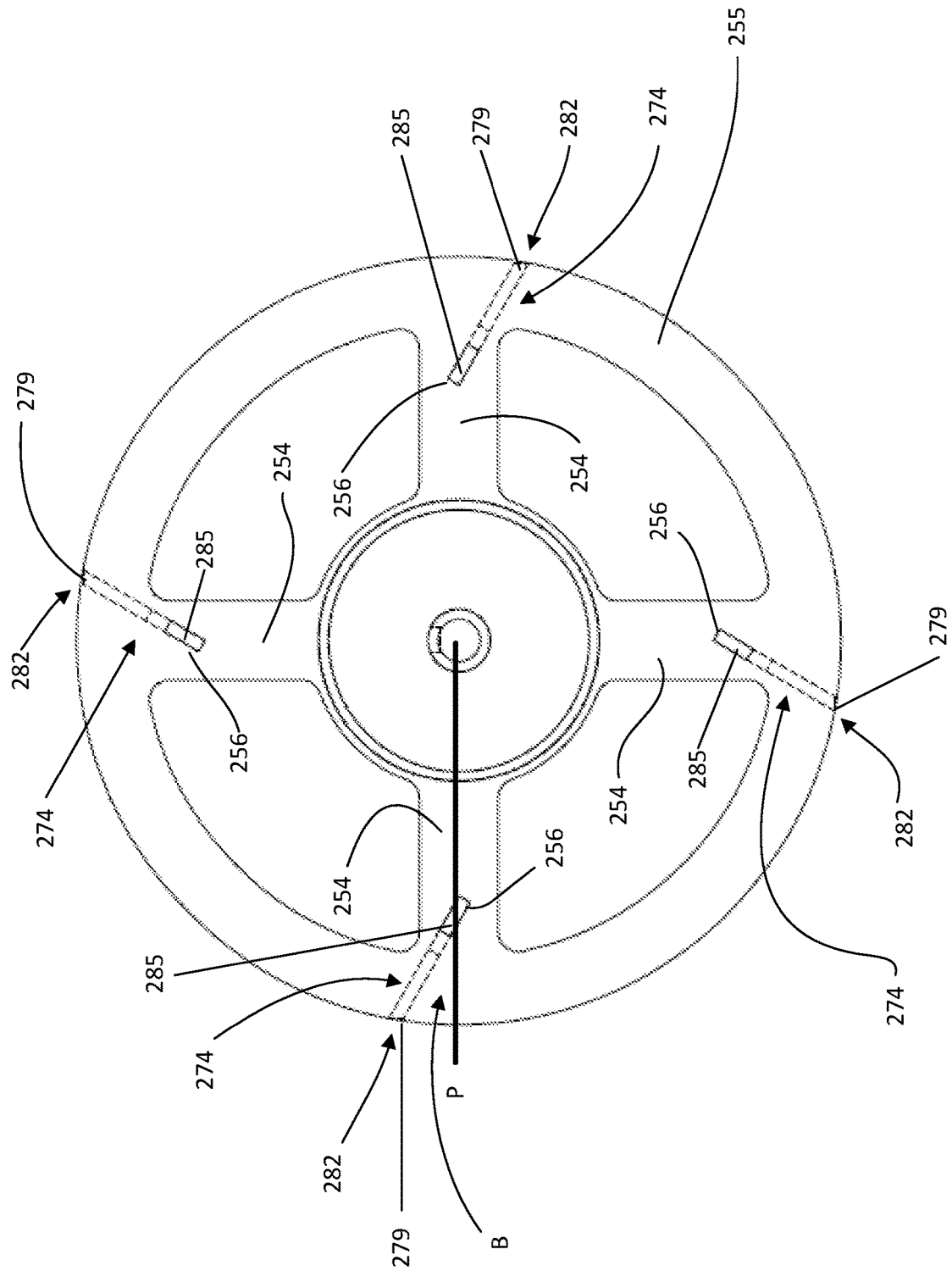
FIG. 7 depicts a front view of the mixing paddle of FIG. 4.

As depicted in FIG. 7, the mixing blades 274 are attached to the spokes 254 and the rims 255 of the first rotor 240 and second rotor 242 at tilt angle as defined by a plane P relative to each spoke 254. The plane P is a reference plane radiating from the center of the first rotor 240 and second rotor 242 and extends through the center, and parallel with the spokes 254. The mixing blades are attached to the rotors 240, 242 at an angle or pitch B in the range of 15 to 50 degrees. Notches 256 in the extension accept the inserts 285 of the mixing blades. The notches 256 are formed on each of the rotors 240, 242. Notches 256 facilitate attaching the mixing blades to the first and second rotors 240, 242 at the desired angle. The bosses 285 are received in the notches 256. The notches 256 are formed at the tilt angle B relative to the radial plane to orient the mixing blades 274 at the tilt angle. The bevel 279 of the elongated edge 282 allows the elongated edge 282 to be substantially flush to the outer peripheral edge of the rim 255.

Figure 8:
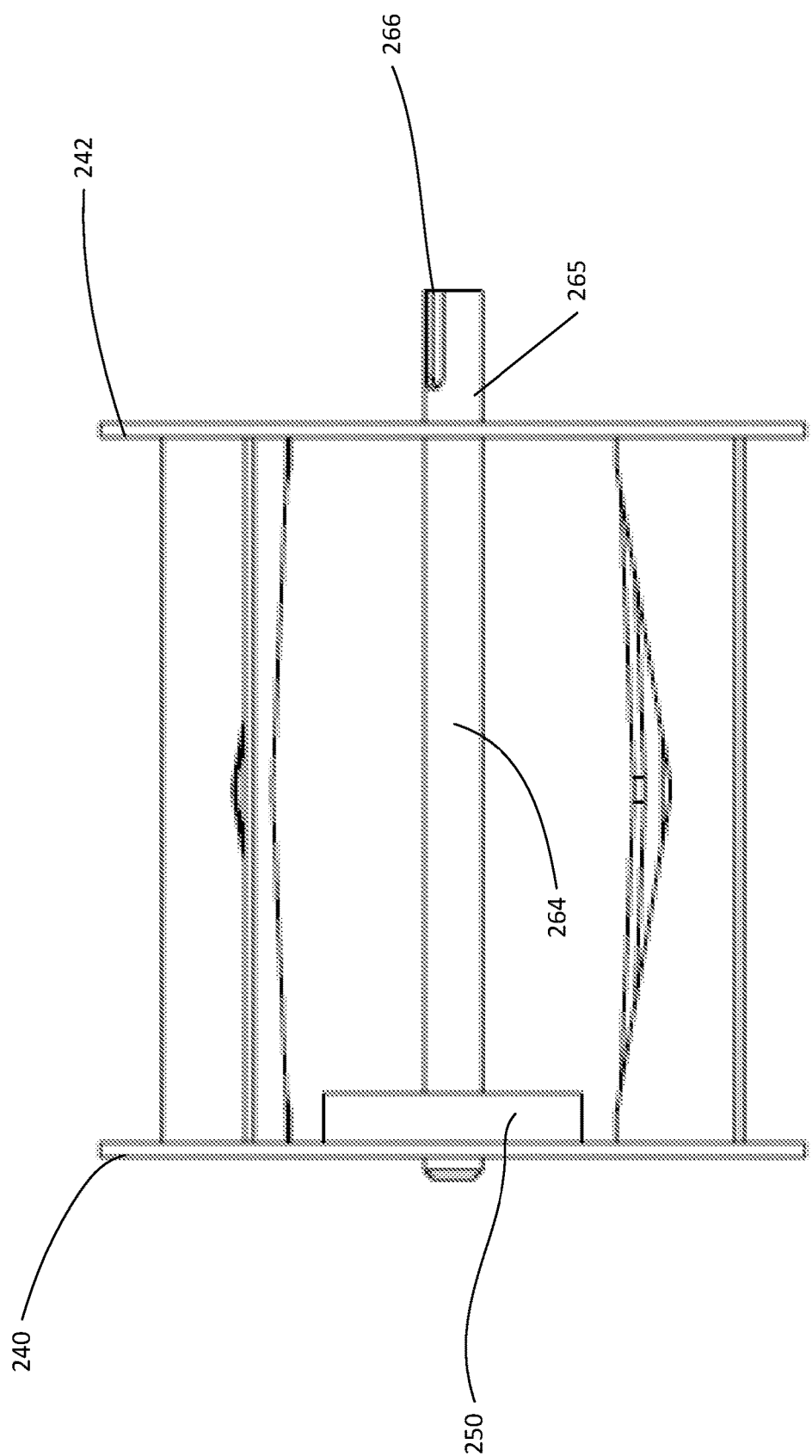
FIG. 8 depicts a top view of the mixing paddle of FIGS. 4 and 5.

As depicted in FIG. 8, the drive shaft 264 extends between the first rotor 240 and the second rotor 242. As depicted in FIG. 8, the drive shaft 264 extends through and beyond the inset hub 250 of the first rotor 240. The drive shaft 264 also extends through and beyond the second rotor 242. The exposed end 265 of the drive shaft 264 extending beyond the second rotor 242 includes a keyway 266. As the drive shaft 264 rotates, it causes the mixing paddle 230 to rotate. The mixing paddle 230 is configured to rotate clockwise (as viewed in FIGS. 3 and 7). As the mixing paddle 230 rotates clockwise, the mixing blade 274 is pitched such that the inner edge 287 leads the outer edge 280.

It is contemplated that the mixing paddle 230 may also be rotated in a counter-clockwise direction. In this rotational instance, the mixing blades would be rotated and orientated 180 degrees from the mixing paddles described above.

Figure 9:
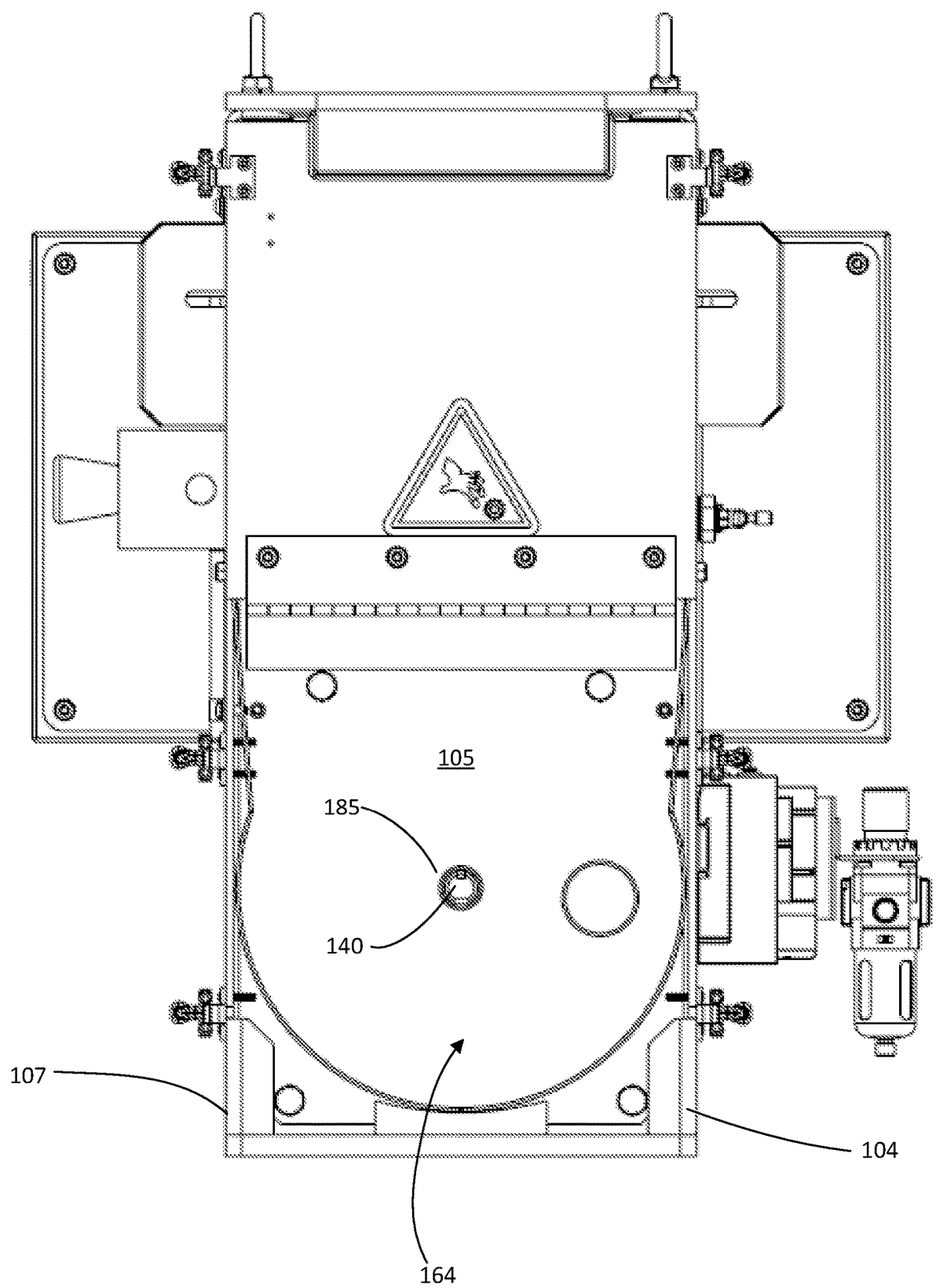
FIG. 9 depicts a front view of part of the gravimetric blender of FIG. 3, and with the mixing paddle removed.

As depicted in FIG. 9, the drive shaft 264 of the mixing paddle 230 is configured to be removably inserted into the opening 185 in the back side 105. The drive shaft 264 extends through the opening and engages the output shaft 140 of the motor via a key and keyway connection.

The mixing paddle 230 configuration provides for increased durability and is capable of withstanding high stress levels. The mixing blade 274 is attached at both ends to the rotors 240, 242. This attachment provides strength across the length of the entire mixing blade 274. Further, the mixing paddle 230 is configured to draw material from the entire mixing chamber 164 into the middle. The mixing paddle 230 configuration reduces or eliminates dead spots within the mixing chamber 164. The mixing paddle 230 extends substantially across the entire mixing chamber 164 thereby enabling the mixing blades to mix and blend ingredient material disposed throughout the entire mixing chamber. Thus, ingredient material dead spots are reduced or eliminated.

As will be evident to those having ordinary skill in the art, the configuration and construction of the gravimetric blender 100 and mixing paddle 230 can vary considerably from the example disclosed, illustrated, and described herein. The gravimetric blender 100 and mixing paddle 230 can be constructed from plastics (nylon), brass, aluminum, stainless steel, or other materials that provide adequate strength. The gravimetric blender 100 and mixing paddle 230 can each be altered in configuration, size, shape, orientation, height, construction, materials, and the like. The gravimetric blender 100 and mixing paddle 230 can include parts or elements that are assembled or connected to one another, as in the illustrated example. Alternatively, portions of the gravimetric blender 100 and mixing paddle 230 can be formed as integral or unitary parts.

As referenced above, the gravimetric blender 100 functions to blend different ingredient materials stored in the supply hoppers 99. The ingredient materials are combined in a desired ratio to create a batch. For example, a user may select a desired recipe from the controller 130. The controller 130 identifies the supply hopper 99 or hoppers containing the selected ingredient material or material needed to create the recipe. The controller 130 operates to open the slide gate 110 associated with the selected supply hopper 99 or hoppers. Material flows out of the supply hoppers 99 and into the weigh hopper 160. The controller 130 monitors the weight of the ingredient material dispensed into the weigh hopper 160.

The weigh hopper 160 catches the ingredient material from the selected supply hopper 99. As ingredient material is collected within the weigh hopper 160, the material is weighed by the load cells 132. The load cells 132 determine the proper amount of material necessary for a particular processing application. Once the proper amount of that ingredient material enters the weigh hopper 164 as determined by the load cells 132, the controller 130 closes the slide gate 110 and stops the flow of ingredient material. The controller 130 opens the gate 162 of the weigh hopper 160 and the ingredient material is gravity fed into the mixing chamber 164. The process of feeding an ingredient material into the mixing chamber 164 is repeated for each ingredient material of the recipe. Once the recipe batch is complete and/or during the feeding process the mixing paddle 230 is rotated to mix the ingredient material.

The controller 130 acts to operate the mixing motor 138. The mixing motor 138 rotates the mixing paddle 230 in a clockwise direction (as viewed in FIG. 3). As the mixing paddle 230 rotates, the mixing blades 274 disturb the ingredient material along the entire width of the mixing chamber 164. A portion of the ingredient material is lifted. As the ingredient material is lifted, the first sloped portion 288 and the second sloped portion 289 of each mixing blade 274 cause the ingredient material to move to the center of the mixing chamber. The angle A of the first sloped portion 288 and the second sloped portion 289 directs the material inward toward the middle of the mixing blade. The material is pulled from the outside of the mixing chamber 164 and moved to the middle of the mixing chamber 164. This motion provides a uniform mixture of the different ingredient materials.

Once the ingredient materials are sufficiently blended, the slide gate 110 at the bottom of the mixing chamber 164 is retracted exposing a through opening (not shown) in the mixing chamber 164. The through opening provides a pathway for the ingredient material to travel via gravity out of the mixing chamber 164 to the next downstream application.

Many modifications to and other embodiments of the disclosed gravimetric blender 100 and mixing paddle 230, components, methods, uses, and the like set forth herein may come to mind to one skilled in the art to which the invention pertains upon reading this disclosure. Therefore, it is to be understood that the inventions are not to be limited to the specific embodiments and combinations disclosed and that modifications and other embodiments and combinations are intended to be included within the scope of the appended claims. Although specific terms are employed herein, they are used in a generic and descriptive sense only and not for purposes of limitation.

Specific combinations of features, components, aspects, procedures, methods, steps, processes, and arrangements of and for the disclosed gravimetric blender 100 and mixing paddle 230 and function are disclosed herein. However, one having ordinary skill in the art will understand that each feature, component, aspect, procedure, method, step, process, and arrangement may be used independently or in other combinations not specifically disclosed.

Although certain features of the gravimetric blender 100, mixing paddle 230, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A mixing paddle comprising:
   a first rotor;
   a second rotor spaced axially from the first rotor; and
   at least one mixing blade disposed between the first rotor and the second rotor,
   wherein the at least one mixing blade includes an inner edge having a first sloped portion and a second sloped portion directed inward toward a middle portion of the at least one mixing blade, the at least one mixing blade being narrower in the middle portion between the outer edge and the inner edge than at a first end and second end.

2. The mixing paddle of claim 1, further comprising a drive shaft extending at least between the first rotor and second rotor along an axis of the mixing paddle.

3. The mixing paddle of claim 1, wherein the first rotor and the second rotor each include a hub and a rim, with spokes extending radially therebetween.

4. The mixing paddle of claim 1, wherein the at least one mixing blade includes a first boss protruding from the first end and a second boss protruding from the second end, wherein the first boss mates with a first notch on the first rotor and the second boss mates with a second notch on the second rotor.

5. The mixing paddle of claim 3, wherein the at least one mixing blade is connected to the rim and one of the spokes of each of the first rotor and the second rotor.

6. The mixing paddle of claim 1, wherein the first rotor and the second rotor each include a hub and a rim with at least one spoke extending radially therebetween and wherein the at least one mixing blade is orientated at a tilt angle in a range of 15 to 50 degrees as defined by a plane of the at least one spoke.

7. The mixing paddle of claim 6, wherein the outer edge is beveled.

8. The mixing paddle of claim 6, wherein the at least one mixing blade includes four mixing blades and the at least one spoke includes four spokes.

9. The mixing paddle of claim 1, wherein the first sloped portion and the second sloped portion form a v-shaped section in the at least one mixing blade that is configured to direct material from each of the first rotor and second rotor inward towards a middle portion of the at least one mixing blade.

10. A gravimetric blender comprising:
    a housing;
    a mixing chamber at a lower portion of the housing; and
    a mixing paddle having at least one mixing blade disposed between a first rotor and a second rotor,
    wherein the at least one mixing blade includes an inner edge having a first sloped portion and a second sloped portion directed inward toward a middle portion of the at least one mixing blade, the mixing blade being narrower in the middle portion between the outer edge and the inner edge than at a first end and second end.

11. The gravimetric blender of claim 10, wherein at least a portion of the mixing chamber is concentric with an axis of the mixing paddle.

12. The gravimetric blender of claim 10, wherein a longitudinal axis of the at least one mixing blade is parallel to a longitudinal axis of the mixing chamber.

13. The gravimetric blender of claim 10, wherein the first sloped portion and the second sloped portion of the mixing paddle form a v-shaped section in the at least one mixing blade that is configured to direct material from each of the first rotor and second rotor inward towards a middle portion of the at least one mixing blade.

14. The gravimetric blender of claim 10, wherein the first rotor and the second rotor each include a hub and a rim with at least one spoke extending radially therebetween and wherein the at least one mixing blade is orientated at a tilt angle in a range of 15 to 50 degrees as defined by a plane of the at least one spoke.

15. The gravimetric blender of claim 10, wherein the mixing paddle extends across the width of the mixing chamber.

16. The gravimetric blender of claim 10, wherein the at least one mixing blade is connected to a rim and spoke of each of the first rotor and second rotor.

17. The gravimetric blender of claim 14, wherein the at least one mixing blade includes four mixing blades and the at least one spoke includes four spokes.

18. The gravimetric blender of claim 10 further comprising a drive shaft with a drive portion that extends through and beyond the second rotor to removably engage with a mixing motor of the gravimetric blender.

19. The gravimetric blender of claim 10, wherein the first rotor and the second rotor each include a hub and a rim with spokes extending radially therebetween.

* * * * *